No Printed Specification Available
8508X
H. Naramore,
Farm Implements
Patented Nov. 24, 1834.
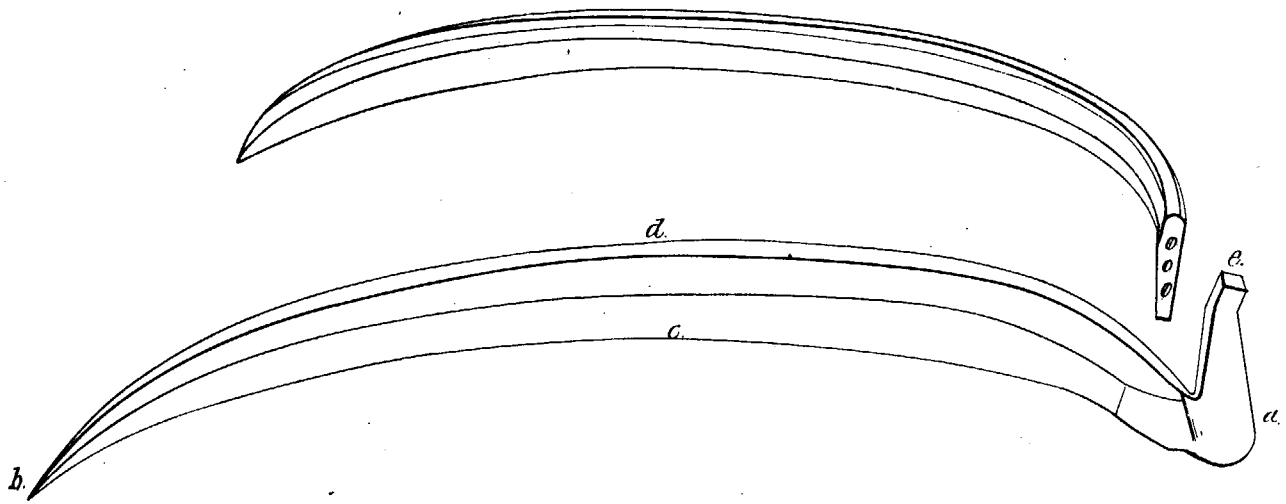
N. PETERS, PHOTO-LITHOGRAPHER, WASHINGTON, D. C.

[illegible] 139

No. [illegible] 1834 49

Horace Naramore. Caledonia N. York

Letters Patent Nov. 24. 1834.

The Schedule referred to in these Letters Patent and making part of the same containing a description in the words of the said Horace Naramore himself of this improvement in the form of the scythe for cutting grain & Grass To all to whom these presents shall come.

Be it known that I Horace Naramore of Caledonia in the County of Livingston and State of New York have invented a new and useful improvement consisting in an improvement in the form of the scythe for cutting Grain and Grass and the following is a full and exact descrip tion of the same as improved by me — the length of the said scythe 4 feet. the width in the widest part 4 inches differing from the scythe already known and in common use in the following particulars. firstly more circular in form. and the major part of the circle being at the heel end of the scythe instead of at the point reversing of it from the usual method. Those made for cutting grain when connected with the grain cradle. the heel is reversed from the common method which is a considerable convenience in fastening the scythe to the sneath of the cradle. The same form of scythe is recommended for cut ting grass with the following exceptions. the scythe should be made narrower and shorter sufficiance may be had to the common grass as to those particulars. also the heel turns the same way as in the scythe already known. I would suggest that the scythe in both instances may be advantageously connected to the sneath by means of screws. What I claim as my invention or discovery is the peculiar form of the scythe as above described together with the method of connecting them to the sneath by means of screws. I do not confine my improvement to any particular in length or breadth but I claim the privilege of manufacturing said scythe to any convenient size which shall prove of the greatest utility Witness
Wm. [illegible]
[illegible] Smith Drawing Horace Naramore Patented 24th Nov. 1834